June 30, 1970 H. H. MANKO 3,517,439

METHOD OF MAKING A MICROMINIATURE CONNECTOR

Filed Dec. 5, 1968

INVENTOR:
HOWARD H. MANKO

BY Popper, Bain & Bobis

ATTORNEYS

United States Patent Office 3,517,439

Patented June 30, 1970

3,517,439

METHOD OF MAKING A MICROMINIATURE CONNECTOR

Howard H. Manko, Teaneck, N.J., assignor to Alpha Metals, Inc., Jersey City, N.J., a corporation of New Jersey

Filed Dec. 5, 1968, Ser. No. 789,634
Int. Cl. H01r *9/00*
U.S. Cl. 29—630 1 Claim

ABSTRACT OF THE DISCLOSURE

A microminiature connector for connecting components of an electric circuit in which a generally elongated, dielectric body is provided with longitudinal, electrically conductive leads permanently bonded to the body, and exposed on its surface for connection thereto.

BACKGROUND OF INVENTION

Field of invention

This invention relates generally to the art of connecting hybrid circuits to other electrical devices, and specifically to microminiature connectors for providing strong, stable, and durable connectors for establishing an electrical circuit between an integrated circuit and other electrical apparatus.

Prior art

In the manufacture of integrated circuits, considerable difficulty may be experienced in connecting the circuit to other electrical devices. To attach a plurality of leads to the integrated circuit is difficult, and the leads may be delicate, unstable, and easily broken.

SUMMARY OF INVENTION

It has been found that an elongated body can be attached to an integrated circuit to provide a most simple connector to join the integrated circuit with another piece of electrical equipment. The elongated body is provided with a plurality of circumferential, separate, electrically conductive, longitudinal leads on its external surface, to which appropriate portions of the integrated circuit can be connected, and in turn, the leads may be connected at the other end to another electrical device. In this manner, a strong, centralized connection point is provided, that is easily electrically joined to another electrical device.

These objects and advantages as well as other objects and advantages may be attained by the device shown by way of illustration in the drawings in which:

THE DRAWINGS

Figure 4:
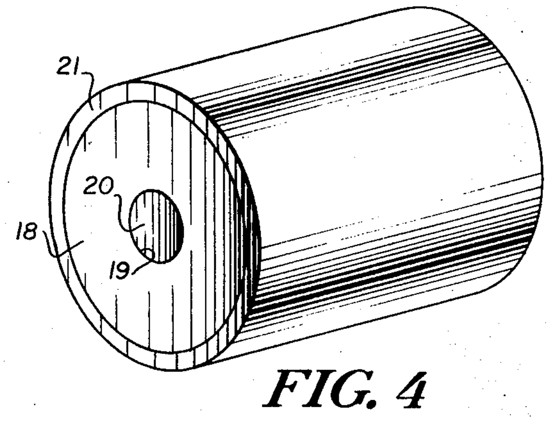
Figure 5:
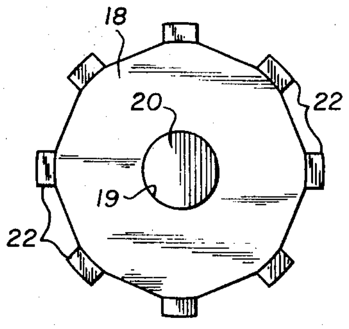

FIG. 4 is a perspective view of a partially completed microminiature connector having an entire, as yet unbroken, metalized electrically conductive longitudinal surface; and FIG. 5 is an end view of the species of microminiature connector shown in FIG. 4, with the metalized electrically conductive surface reduced in strips down to the dielectric core, to provide a plurality of electrically conductive, separate longitudinal leads extending outwardly from the dielectric core.

PREFERRED EMBODIMENT

Figure 1:
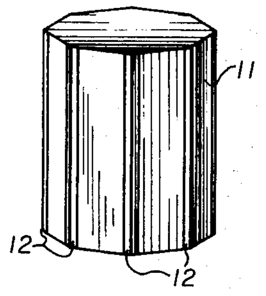
FIG. 1 is a side perspective view of an octagonal microminiature connector with external longitudinal leads exposed at its corners.

Referring now to the drawings in detail, FIG. 1 shows a first species of the invention in which there is a dielectric, elongated octagonal body or base 11. Each of the corners of the body 11 is provided with a channel into which a metalized stripe 12 of electrically conductive material is applied. These stripes 12 may be formed in many other ways, e.g. painting on a self-curing metal paint; painting on a low temperature, heat curable metal paint as is well known in the ceramic arts, and then fusing it to the body 11; pressing metal leads 12 into the body 11, inserting metal leads 12 into channels in the body, etc. The body 11 may be made of plastic material, or even of ceramic material; in the latter case, the well known metalizing techniques for metalizing ceramic bodies may be applied.

Figure 2:
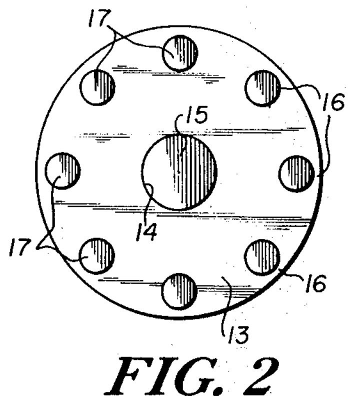
FIG. 2 is an end view of a partially completed microminiature connector, having a stiffening core in an axis bore and radial leads as yet completely imbedded in the body of the connector.
Figure 3:
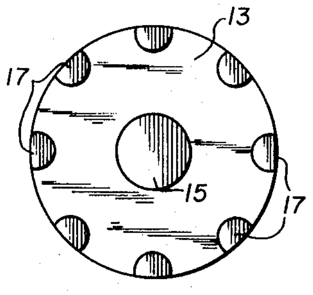
FIG. 3 is an end view of the same species of micominiature connector shown in FIG. 2 except that the peripheral surface has been reduced, to expose nearly one-half of the circumference of the radial leads.

Another method of forming a different species of the microminiature connector is shown in FIGS. 2 and 3. In FIG. 2, there is shown an elongated dielectric body 13. This body is provided with a central axial bore 14 into which a non-conductive stiffening or reinforcing rod 15 may be inserted. This rod 15 may also be made of conductive material if an additional conductive lead is required. Arranged radially, and equidistant from the central rod 15, a plurality of radially arranged, longitudinal bores 16 are located. In each of these bores 16, there is an electrically conductive lead 17.

By a milling process, by cutting wheels, or by abrasion, the surface of the body 13 is reduced, and the leads 17 are reduced until nearly one-half of each 17 is exposed, allowing sufficient of the body 13 to remain to capture (or overlay) a little more than 180° of the circumference of the leads, as shown in FIG. 3.

FIG. 4 illustrates the species of incompleted microminiature connector shown completed in FIG. 5. There is provided an elongated dielectric body 18, with a central bore 19 into which a core 20 of chosen material is inserted. A layer 21 of electrically conductive material is bonded to the surface of the body 18. Then the surface of the layer 21 is reduced by any suitable method until discrete lands in the form of separate, longitudinal leads 22, which are isolated from each other, remain on the surface of the body 18.

These microminiature connectors are then ready for use by inserting them in holes in integrated circuits, or by adhesively attaching them thereto, etc. The leads 12, 17, 22 are then attached at one end to suitable portions of the integrated circuit. The other ends of the leads may then be attached to other electrical apparatus.

The foregoing description is merely intended to illustrate an embodiement of the invention. The component parts have been shown and described. They each may have substitutes which may perform a substantially similar function; such substitutes may be known as proper substitutes for the said components and may have actually been known or invented before the present invention.

What is claimed:

1. A method for making microminiature connectors comprising (a) forming a dielectric body, (b) forming a plurality of bores in the body, (c) inserting electrically conductive leads in the bores, (d) reducing the surface of the body until a portion of the lead, less than its greatest transverse dimension, is exposed in the surface of the body.

References Cited

UNITED STATES PATENTS

| | | | |
|---|---|---|---|
| 2,619,553 | 11/1952 | Kroeckel | 174—97 XR |
| 3,366,854 | 1/1968 | Robinson | 174—70 XR |
| 3,103,060 | 9/1963 | Fay | 29—597 |
| 3,148,356 | 9/1964 | Hedden | 174—68.5 XR |

DARRELL L. CLAY, Primary Examiner

U.S. Cl. X.R.

29—597; 174—68.5